United States Patent [19]

Iler et al.

[11] 4,010,242
[45] Mar. 1, 1977

[54] UNIFORM OXIDE MICROSPHERES AND A PROCESS FOR THEIR MANUFACTURE

[75] Inventors: Ralph K. Iler; Herbert J. McQueston, both of Wilmington, Del.

[73] Assignee: E. I. DuPont de Nemours and Company, Wilmington, Del.

[22] Filed: Nov. 20, 1973

[21] Appl. No.: 417,595

Related U.S. Application Data

[62] Division of Ser. No. 242,039, April 7, 1972, Pat. No. 3,855,172.

[52] U.S. Cl. .................... 423/335; 106/41; 106/288 B; 264/15; 264/44; 264/59; 423/592; 423/608; 423/617; 423/618; 423/628; 423/633

[51] Int. Cl.$^2$ .................. C01B 33/12; C04B 21/04

[58] Field of Search ........... 106/41, 69, 122, 288 B, 106/299, 300, 304; 252/448, 449; 260/39 SB, 39 R; 264/15, 44, 59; 423/335, 338, 339, 592, 608, 610, 617, 618, 625, 628, 631, 633, 634

[56] References Cited

UNITED STATES PATENTS

| | | | |
|---|---|---|---|
| 2,383,653 | 8/1945 | Kirk | 252/309 |
| 2,751,366 | 6/1956 | Braendle | 260/39 SB |
| 2,776,267 | 1/1957 | Weber | 260/39 P |
| 2,844,436 | 7/1958 | Baker et al. | 423/305 |
| 3,041,140 | 6/1962 | Alexander | 423/335 |
| 3,223,482 | 12/1965 | Puddington et al. | 423/335 |
| 3,251,800 | 5/1966 | Cooley et al. | 260/39 SB |
| 3,281,216 | 10/1966 | Mindick et al. | 423/335 |
| 3,301,635 | 1/1967 | Bergna et al. | 423/335 |
| 3,417,028 | 12/1968 | Montgomery et al. | 423/338 |
| 3,776,987 | 12/1973 | Grimes et al. | 106/41 |

FOREIGN PATENTS OR APPLICATIONS

| | | | |
|---|---|---|---|
| 809,284 | 2/1959 | United Kingdom | 423/610 |

*Primary Examiner*—G. O. Peters
*Assistant Examiner*—Gary P. Straub

[57] ABSTRACT

Oxide microspheres having a diameter in the 0.5 to 20 micron range are produced by forming a mixture of urea or melamine and formaldehyde in an aqueous sol containing colloidal oxide particles. Copolymerization of the organic constituents produces coacervation of the organic material into microparticles containing the inorganic material. The organic constituent can be burned out to form a powder of uniform-sized porous microparticles consisting of an interconnected array of inorganic colloidal particles separated by uniform-sized pores.

6 Claims, 4 Drawing Figures

UNIFORM OXIDE MICROSPHERES AND A PROCESS FOR THEIR MANUFACTURE

This is a divisional of application Ser. No. 242,039, filed on Apr. 7, 1972, and now issued Dec. 17, 1974, as U.S. Pat. No. 3,855,172.

BACKGROUND OF THE INVENTION

1. Field of the Invention

This invention relates to microspheres composed of a plurality of inorganic colloidal particles and to a process for their manufacture which proceeds by coacervation of organic material into microspheres containing the colloidal inorganic particles. The composite structures containing the organic material and the colloidal inorganic particles are useful for a variety of purposes including flame resistant and pigmenting fillers. Porous microspheres, formed by burning out the organic material from the composite structures are useful for a variety of purposes including catalytic and chromatographic packings such as those disclosed in U.S. Pat. No. 3,782,075 for Completely Porous Microspheres for Chromatographic Uses filed on the same day as the present application by J. J. Kirkland, the disclosure of which is hereby incorporated by reference into the present specification.

2. Description of the prior art

Powders composed of porous silica microspheres having a diameter in the range of 0.1 to 50 microns have been made by spray drying sols containing colloidal silica. As disclosed in U.S. Pat. No. 3,301,635, for Molded Amorphous Silica Bodies and Molding Powders for Manufacture of Same, which issued to H. E. Bergna et al on Jan. 31, 1967, the microspheres produced by this process are nonuniform aggregates of colloidal silica particles which combine to form a powder having a tapped bulk density of at least 0.2 gms/cm.$^3$. The microparticles are lightly coalesced structures having large nonuniform pores. Upon compaction at elevated temperature they form very dense silica bodies with smaller yet more uniform pores.

Another process for forming extremely small porous silica particles is disclosed in U.S. Pat. No. 3,591,518 for Silica Aquasols and Powders which issued to D. McMillan on July 6, 1971. This process comprises providing a heel containing silica sol and aqueous ammonium hydroxide, introducing finely-divided silicon metal into the heel and permitting the metal and water to react in the presence of ammonia to form silica. The silica so formed polymerizes on the heel rather than form new nuclei so the size of the particle can be controlled. The product formed is a powder of small porous particles, having a diameter of 0.15 to 0.50 microns, each of which is made up of an aggregate of still smaller ultimate particles having a diameter of 2.5 to 6.0 millimicrons.

Still another process for the formation of porous inorganic oxides is disclosed in U.S. Pat. No. 3,417,028 for a Process for the Preparation of an Inorganic Gel Having a Predetermined Pore Structure which issued to D. S. Montgomery on Dec. 17, 1968. This process proceeds by adding a water soluble organic polymer to a hydrous gel of the oxide, dehydrating the mixture until it sets, then removing the organic material by thermal decomposition. The structure formed is in the form of a filter cake with a controlled pore size distribution and an enlarged pore volume.

Finally, U.S. Pat. No. 2,383,653 for Silica Acid Sols which issued to J. S. Kirk on Aug. 28, 1945 discloses a process for producing microscopic spheres by precipitation from a N,N'-bis(methoxymethyl) uron, polysilicic acid solution N,N'-bis(methoxymethyl) uron is a derivative of urea and formaldehyde and polysilicic acid contains silica particles of molecular size. According to Kirk, the product formed is an interpolymer of polysilicic acid and N,N'-bis(methoxymethyl) uron. He does not discloses thermal decomposition of the organic material, but as shown below, the pore diameter of such a product would be extremely small and the particles would sinter to a nonporous state at elevated temperatures.

The silica microparticles formed by the processes of the prior art are generally either very dense structures or they are highly porous structures of nonuniform diameter. The present invention deals with a new process for the formation of oxide microparticles, having a diameter in the 0.5 to 20 micron range, which have a uniform size. In its preferred aspects, it relates to the formation of oxide powders comprising porous, uniform-sized microspheres having a controlled uniform pore size and a large specific surface area.

More specifically, microspheres in the 0.5 to 20, preferably 1 to 10, micron range made by the process of the present invention from colloidal particles in the 5 to 500 millimicron size range have a unique combination of uniform sphere diameter and pore dimensions. The pore diameter is large relative to the surface area within the sphere which allows rapid diffusion of materials to all parts of the inner surface

SUMMARY OF THE INVENTION

According to this invention, there is provided a process for forming uniform-sized inorganic microparticles comprising the steps of:

a. forming a sol of uniform-sized inorganic colloidal particles in a polar liquid, the colloidal particles having a hydroxylated surface and being dispersible in said polar liquid;

b. forming a mixture of the sol with a polymerizable organic material which is initially sufficiently miscible in said polar liquid to form a uniform mixture;

c. initiating polymerization of the organic material in said mixture to cause coacervation of the organic material and said colloidal particles into substantially spherical microparticles having a diameter of about 0.5 to about 20 microns;

d. solidifying the microparticles so formed; and e. collecting, washing and drying said microparticles.

In the preferred embodiment, the organic material comprises formaldehyde and either urea or melamine and polymerization proceeds by copolymerization. Furthermore, the colloidal particles are metallic oxide particles which are stable in an acidic solution and copolymerization is initiated by reducing the pH of the solution. To insure that the process forms distinct microparticles, the mixture can be subjected to a mixing action of sufficient intensity to prevent aggregation of the microparticles during their formation.

In another aspect of the invention, the colloidal particles are refractory metal oxides such as silica, alumina, titania, zirconia, ferric oxide, antimony oxide zinc oxide, and tin oxide, and the process further comprises the step of subjecting the microparticles to a temperature sufficient to burn off the organic material without melting the inorganic colloidal particles. By this process uniform-sized porous particles are formed. To impart strength to the porous particles, they can then be sintered at an elevated temperature sufficient to reduce the specific surface area by at least about 10% below that obtained on a powder dried from the original sol.

Powders of uniform-sized, substantially spherical, microparticles having an average diameter of about 0.5 to about 20 microns, preferably 1.0 to 10 microns, are also within the scope of this invention. The microparticles in this powder have a diameter ranging from 0.5 to 1.5, preferably 0.8 to 1.2, times the average diameter of the microparticles in the powder, and are composed of a plurality of uniform-sized colloidal ultimate particles having an oxide surface and at least two dimensions in the range of 5 to 500 millimicrons with the third dimension in the range of 5 to 1000 millimicrons. These colloidal particles are arranged in a three-dimensional matrix within the polymer sphere. Prior to burning off the organic material, the particles will contain a large percentage of polymer, generally greater than 50% by volume. When the organic material is burned off at about 550° C. the colloidal particles form a lightly interconnected three-dimensional network of inorganic material surrounding a plurality of uniform-sized pores. The pore content of the microspheres remains high, normally greater than 50% by volume. On the other hand, the specific surface area of the particles after removal of the organic component at 550° C. is approximately equal to a comparable amount of the colloidal material. The particles of the present invention, therefore, constitute a unique structure with an extremely high pore volume and surface area and a uniform pore distribution. Furthermore, the size of the microparticles in the powder is extremely uniform. Less than 5% by weight of the particles have a particle diameter smaller than 0.5 times the average sphere diameter and less than 5% by weight have a sphere diameter greater than 1.5 times the average sphere diameter. Preferably the range is 0.8 to 1.2 times the average sphere diameter.

DETAILED DESCRIPTION OF THE INVENTION

In the present invention, a sol containing organic colloidal particles in a polar liquid is first prepared. The sol is normally an aqueous sol but it can be a mixture of water and other non-effecting liquid materials, or even a non-aqueous polar liquid. The primary considerations are that the colloidal particles are relatively insoluble and dispersible in the polar liquid; that the organic material is initially sufficiently miscible in the polar liquid to form a uniform mixture; and that the organic material will polymerize in the polar liquid at one stage to form a coacervate. Under normal circumstances, the sol will be an aqueous sol, and for convenience, the discussion which follows will be limited to that situation.

The formation of the microparticle proceeds by association of the inorganic colloidal particle with the organic coacervate. It is postulated that the extreme uniformity in both the size of the microparticle and the distribution of the colloidal particles within the microparticle depends on an interaction between hydroxyl groups on the surface of the particle and portions of the polymer chain. For this reason, at least prior to the onset of polymerization, the colloidal particles must have hydroxyl groups on their surfaces equivalent to a hydrated oxide surface. The interior of the particles may consist of other materials but the surface must be capable of being hydroxylated.

To begin with, then, the inorganic material used in the present invention must be an oxide or oxide coated material, i.e., one that develops a hydroxylated surface. However, to be useful in the present invention, the inorganic material must be present as surface-hydroxylated particles of colloidal size which are insoluble and colloidally dispersed in the medium required for the polymerization of the organic material used; in particular, an acidic medium containing urea formaldehyde or melamine formaldehyde. Thus water-insoluble, acid-insoluble oxides can be used. Normally, oxides of metals are preferred so any water-insoluble, acid-insoluble oxide of groups IIIB, IVB, VB, and VIB of the Periodic Table, as well as those of silicon, germanium, tin, antimony and bismuth may be used. A water-soluble higher oxide of chromium, e.g., chromium trioxide, is obviously unsuitable, but, the lower oxide $Cr_2O_3$ which forms relatively acid-resistant colloidal particles, may be used. In the same manner, those oxides of the rare earth elements which remain undissolved at room temperature for a period of several hours at pH 2 may be used. On the other hand, the basic types of finely-divided oxides such as those of magnesium, calcium, barium, are obviously unsuitable. Oxides which in finely-divided form will pass into solution slowly, must be polymerized with the organic components at maximum feasible pH to coprecipitate the oxide with the organic polymer before the acidic medium dissolves the metal oxide; here melamine-formaldehyde is preferred.

It should be recognized that the acid insolubility of some colloidal metal oxides depends upon the crystallite size and the perfection of the crystallization; thus, for example, colloidal chromium oxide formed by dispersing freshly precipitated chromium hydroxide is soluble in acid, but, after it has been heated long enough to develop larger colloidal particles, it becomes more acid resistant, and may be used. Another way to obtain acid resistant particles consisting essentially of an acid-sensitive metal oxide is to coat the particle with an impervious layer of silica. Thus, particles of iron oxide or of nickel oxide may be coated by suspending them in a 1% solution of sodium silicate and heating the mixture to hydrolyze the salt and liberate silica which is deposited upon the surface of the oxide particles. A general process for coating finely-divided particles with an impervious layer of silica is described in U.S. Pat.

No. 2,885,366, which issued on May 5, 1959 to R. K. Iler. Thus, particles of a wide variety of inorganic materials with a skin of silica may be used in this invention. For example, finely-divided particles of metal, such as nickel for example, which ordinarily dissolve rapidly in water at a pH of 2, may be coated with a thin film of silica, to make it acid resistant, and then these particles can be converted into porous spheres by the process of this invention. In this case, the removal of the organic polymer from the spheres must be carried out at the lowest possible oxidation temperature to avoid disruption of the silica skin on the metal particles.

Mixtures of colloidal oxide particles, for example those of zirconia and silica or alumina and silica, can be used to make porous spheres having a mixed composition. When these are heated to elevated temperature, chemical interaction may occur and the oxides in the porous spheres may react to form refractory compounds. Thus, at high temperature, mixtures of silica and tin oxide may be converted to particles of tin silicate.

If the microparticles are to be converted to porous particles by burning out the organic constituent, to leave a solid network of the inorganic material, at an elevated temperature sufficient to oxidize the organic constituent without melting the colloidal particles, then any inorganic colloid that leaves a solid pseudomorph after the polymer is removed may be used. The preferred colloids for use in this embodiment are composed of refractory metal oxides which do not melt or otherwise decompose at about 500° C. This is about the lowest temperature that can be used to burn out the organic constituent. Generally, however, the refractory particles will have a melting point greater than 1000° C., but lower melting oxides or hydroxides which are converted to oxides by heating can be used if the polymer constituent of the microparticle is removed by slow oxidation at lower temperatures.

The ultimate particles of the present invention must be colloidal in size. For the purpose of the present invention, this means that at least two of the dimensions of the ultimate particle must be in the range of 5 to 500 millimicrons and the other dimension must be in the range of 5 to 1000 millimicrons.

Particles having one dimension larger than about a micron are difficult to incorporate with organic polymers into spheres, because the spheres which generally form are only a few microns in diameter and large particles interfere with the formation of such discrete spherical units. Thus, some clays such as kaolin consisting of platelets 20 to 40 microns in diameter and 5 microns thick, do not form the spherical composite particles of this invention. Although the clay particles which are precipitated along with the urea formaldehyde polymer are intimately associated with the polymer, the product does not consist of uniform spheres, but masses of irregular shape. Similarly, asbestos fibrils which are only about 50 millimicrons in diameter, but are longer than 1000 millimicrons, tend to give only irregular masses when coprecipitated with the urea formaldehyde polymer. However, if these materials are reduced in particle size, and especially if they are treated to ensure that the surface is siliceous, then they may be used in the process of this invention.

The particle size and shape of the inorganic colloidal particles is, therefore, limited to more or less isodimensional particles or rod-shaped particles. Leaflike colloidal particles give rise to very fine irregular shaped microparticles while more or less spherical colloidal particles give rise to spherical microparticles. Generally colloidal particles with dimensions greater than about 0.1 times the diameter of the microsphere or greater than 1000 millimicrons in one direction or with more than one dimension greater than 500 millimicrons do not give uniform-sized particles.

The organic components must be soluble in the polar liquid, which generally means they must be water soluble and miscible with the inorganic colloid without flocculating or dissolving it at the pH at which the reaction occurs; which in the case of urea or melamine and formaldehyde, this is at a pH of 2 to 6. The polymer in the course of formation must combine with the inorganic colloid particles to form a coacervate which appears as rounded droplets which then harden as polymerization is completed.

Coacervation of the organic components and the colloidal particles into uniform-sized microparticles in which the colloidal particles are uniformly distributed, appears to require more than mere mechanical entrapment of the colloidal particles in the polymerizing material. For example, urea and formaldehyde will polymerize to form a precipitate in an acidic aqueous medium, but separate spherical uniform-sized particles do not form. To achieve the high degree of uniformity in both particle size and colloidal particle distribution within the microparticle, some interaction between the oxide surface of the colloidal particles and the polymer chain appears to be involved. The highest degree of uniformity in both of these features appears to be dependent upon the use of a copolymerizing mixture of urea and formaldehyde, in mol ratio of about 1 to about 1.2 or 1.5 and a pH of about 1.0 to about 4.5, or a copolymerizing mixture of melamine and formaldehyde, in mol ratio of about 1 to about 3 and a pH of about 4 to about 6.

The ratio of the organic material to the inorganic material should be such that, after polymerization, the precipitated particles contain from about 10 to about 90% by weight of the inorganic component. This depends to some extent upon the relative density of the organic and inorganic components. The composition can also be expressed as percentage by volume of the components in the microparticle. The percent by volume of the inorganic component of the microparticle will usually range from about 10 to about 50% although up to about 70% is theoretically possible. The microparticles consist of a spherical mass of polymer in which the colloidal particles are embedded. The latter cannot generally have a packing density of more than 50% by volume unless there are two sizes of particles present so that the smaller ones can fit into the interstices between the close-packed larger particles. If the organic particles are spherical, very uniform in size and larger than 0.1 micron in diameter, however, they may be packed to a density approaching 70% by volume.

Initially, very fine copolymer particles are formed and these grow as polymerization progresses. Under some conditions, one family will grow to 10 microns and then a second family of smaller particles will form. Surfactants and water miscible solvents may be added to modify the size of the particles produced.

The spheres obtained in suspension or as a precipitate when the organic components are polymerized in a suspension or sol of inorganic colloidal particles, consists of a matrix of polymer forming a sphere within which the inorganic particles are embedded. In some instances, the inorganic component is concentrated near the surface of the sphere so that when the polymer is burned out, a porous spherical shell is obtained. To obtain a coherent porous sphere after the organic matter is burned out, there must be a sufficiently high concentration of inorganic particles within the matrix to link together into a three-dimensional matrix. This network may be very fragile when obtained at 550° C. but if heated, undisturbed at higher temperatures to initiate sintering, the porous spheres develop strength. They may shrink in size slightly, but they retain their general shape.

When the porous spheres of this invention are heated to elevated temperature, i.e. over 1000° C., sintering occurs, with loss of specific surface area. Sintering may be visualized as the closing of pores within the spheres due to the surface tension of the solid surface which exerts a contracting force on the particles surrounding a pore. Since the compressive strength of the spheres is low at high temperature, the particles are drawn together and the pores between them shrink. To provide strength to the porous microparticles of the present invention, they are sintered at an elevated temperature. A temperature which will reduce the specific surface area of the particles by at least about 10% below the value obtained on a powder dried from the original sol is sufficient.

In a body consisting of pores of different sizes, however, the smaller pores will become smaller as the surrounding particles are drawn together. At the same time, the larger pores where surface forces are smaller, will become even larger in diameter as the surrounding particles are drawn apart. This is because the forces tending to close a small pore are greater than those acting on a larger pore. Consider two porous bodies of the same material such as silica, one containing 50% by volume of very fine pores because the body is made up of a network of very fine particles, and the other containing 50% by volume of coarse pores because the body is made up of a network of larger particles. At a given elevated temperature, the body with the finer pores will tend to shrink and the pores sinter together and become eventually eliminated, while the body made of larger particles and coarser pores will remain porous.

We thus have the anomaly that porous spherical particles of this invention made from 5 millimicron colloidal silica particles, for example, will initially have a tenfold higher specific surface area than porous spherical particles made from 50 millimicron colloidal silica particles; yet when these two types of porous spheres are heated, for example at 1050° C., the spheres made from finer particles containing very fine pores will shrink and the specific surface area will drop to a low value, while the spheres containing coarse pores will shrink much less and will retain an appreciably higher specific surface area.

It is a distinctive feature of the present invention to employ silica particles of such size that when heated to 800° or 900° C., the product will retain high porosity. Preferred products will retain high porosity and high specific surface area even after being heated at 1050° C. The value of such porous bodies as catalyst supports which will retain their highly porous character is obvious.

Earlier examples from the prior art of the interaction of urea formaldehyde polymers with polysilicic acid at low pH such as disclosed by J. S. Kirk in U.S. Pat. No. 2,383,653 disclose a form of spherical porous silica combined with organic polymer. If the organic matter had been burned out of Kirk's product, the pores in the silica sphere would have been so small that they would sinter to a nonporous state at 1050° C. This is because the polysilicic acid which was obtained by reacting sodium silicate with acid at low pH and low temperature, as described by Kirk, consists of polysilicic acid equivalent to silica particles only 1 or 2 millimicrons in diameter. Such polysilicic acid molecules cannot be observed in the electron microscope. They are below the range of colloidal size, which is generally considered to be above about 5 millimicrons. Particles below this size are considered to be polymer molecules, and in the case of silica are generally classed as polysilicic acids. Polysilicic acid is not suitable as a starting material for making temperature-resistant porous spheres since the spheres produced shrink at high temperature and are converted to nonporous dense spheres.

After the organic material is burned out of the products of the present invention, by heating them in air for 16 to 48 hours in a layer less than one inch in depth, the porous spheres are generally fragile. They are readily crushed when the powder is placed on a microscope slide and a cover glass rubbed over it. Apparently with the removal of the organic binder, much of the strength of the aggregate is lost. The temperature at 550° C. is not sufficient to cause appreciable sintering of the ultimate colloidal particles. The strength of the porous spheres is increased by partial sintering at higher temperature.

For silica products which are to be heated only to 900° C., the presence of some residual sodium remaining as sodium chloride after the acidification of alkali stabilized sols, can have a beneficial effect on the rate of sintering. However, the presence of sodium is detrimental in silica products which are to be heated to 1050° C., because traces of salt promote the crystallization of amorphous silica to crystobalite, with radical changes in the structure of the product.

To remove sodium and other alkali metal salts, it is advantageous to wash the porous silica spheres after they have been heated in air at 550° C., with a strong acid such as hydrochloric or nitric, to neutralize alkaline material that may be present, particularly sodium, and then to wash out the acid and salts, leaving a purer silica before the product is further heated to 1050° C. However, it is preferred to eliminate alkali metal impurities from the silica before it is used in the process. In all silica products described in the examples, it will be understood that the products made from alkali stabilized silica sols have been treated with acid and washed after having removed the organic material at 550° C., and before further heating to higher temperature.

The microspheres of the present invention have uniform pores, the diameter of which depends on the size of the colloidal particles used in their preparation and the ratio of the volume of organic polymer to inorganic material used. The larger the particles, the larger the pores between them; the greater the proportional volume of organic polymer in the microspheres when formed, the more open the network of inorganic particles and the wider the pores.

The average diameter of the pores in the microspheres of the present invention is at least half the calculated diameter of the ultimate particles making up the microsphere. This diameter is calculated from the equation $$D = 6000/dA$$

when $D$ is the calculated diameter of the ultimate particle, $d$ is the density of the solid inorganic material (e.g., 2.2 grams per cm.$^3$ for amorphous $SiO_2$) and $A$ is the specific surface area of the microsphere as determined by nitrogen adsorption, as disclosed by F. M. Nelson and F. T. Eggerstein in Analytical Chemistry 30, 1387 (1958).

Figure 4:
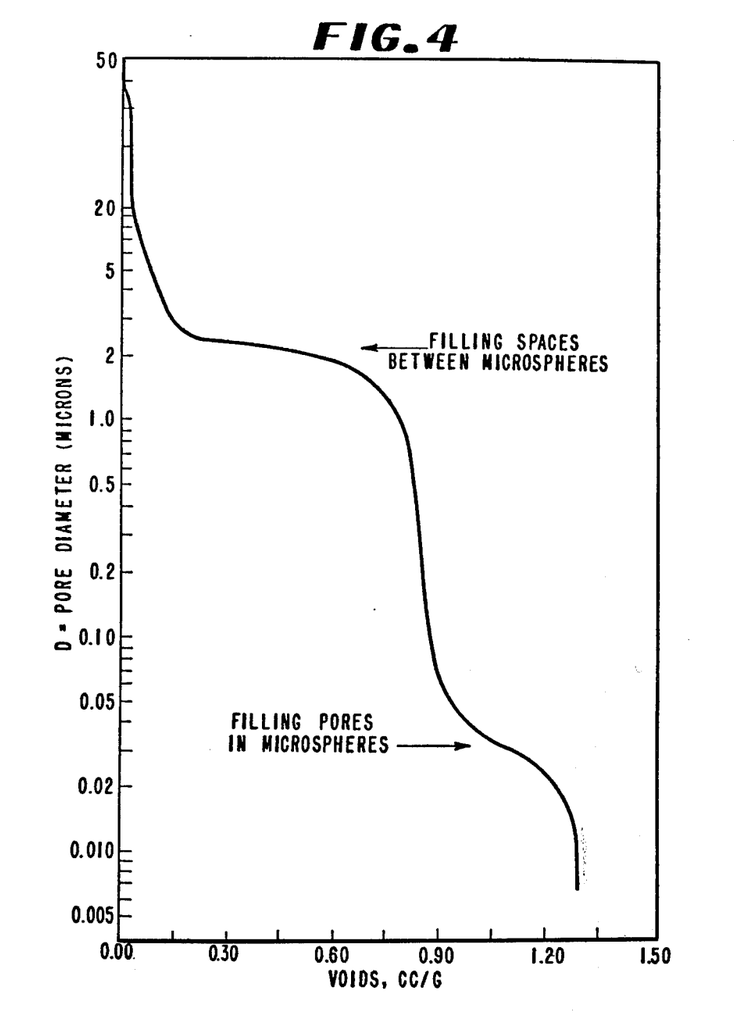
FIG. 4 is a plot of the pore size distribution in a porous silica microsphere having a diameter of 5–6 microns and composed of 50 millimicron ultimate particles.

FIG. 4 is a plot of the pore volume attributable to pores of a given diameter in a powder composed of porous silica microspheres having a diameter of 8 to 9 microns. The measurements were made by the mercury intrusion method commonly used to characterize catalysts. The pore volume is measured directly from the amount of mercury absorbed by the material and the pore size is measured indirectly by the pressure required to force the mercury into the pores. The increase in specific void volume at a pore diameter of 2.0 microns corresponds to the space between the microspheres indicating that the average diameter of the spaces between the microspheres is about 2.0 microns. The increase at 0.03 micron corresponds to pores within the mirospheres, indicating that the average diameter of the pores in the microsphere is about 300 millimicrons.

The invention will now be described with fully illustrative examples.

EXAMPLE 1

A sol of 50 millimicron silica particles which was essentially free of sodium, was made in accordance with the teaching of U.S. Pat. No. 2,680,721 by deionizing "Ludox"* HS colloidal silica, a commercial silica sol, containing particles of about 14 millimicrons in diameter diluted to 21% by weight of $SiO_2$, and then autoclaving the sol at autogenous pressure and 325° C. for about 4 hours to grow the particles to 50 millimicrons in diameter.

* Registered trademark of the E. I. du Pont de Nemours & Co.

Twenty-five mls. of this 50 millimicron sol, containing 16.7 g. of $SiO_2$, was diluted with water to a volume of 100 mls. and the pH adjusted to 2 by adding concentrated hydrochloric acid while stirring rapidly. Then 15 g. of urea was added and stirred until dissolved. Finally 25 g. of a 37% aqueous solution of formaldehyde was added to the mixture and the pH was again adjusted to 2 by adding more concentrated hydrochloric acid, while stirring the mixture rapidly. The stirring was then stopped, and the solution was allowed to stand at room temperature for 2 hours. Within a few minutes, the mixture had turned white and opaque, due to the formation of spherical particles of a complex of silica and urea formaldehyde polymer. After aging for 2 hours, the mixture was agitated at high speed for 1.5 minutes in a mixer to disperse the spherical particles, and the mixture was then permitted to settle for 16 hours, at which time a white cake of solid product had settled to the bottom. The clear aqueous supernatant liquid was discarded. The white cake was then reslurried in 250 mls. of water and permitted to settle, the supernatant liquid poured off, and the cake reslurried in water. This operation was repeated four times. The washed product, in the form of a wet settled cake, was dried in a vacuum at 60° C. for 16 hours. This product consisted of powder of microparticles consisting of 50 millimicron silica particles in a urea formaldehyde polymer. The particle had an average diameter of about 5 microns. Chemical analysis of the vacuum dried product showed the presence of 3.8% hydrogen, 17.2% carbon, 19.1% nitrogen, and 49% ash which was silica.

The vacuum dried material was then heated in an air oven at 550° C., raising the temperature slowly, to burn off organic material. The powder turned black as thermal decomposition progressed, but later became white as the carbonaceous material was oxidized, leaving 15.4 grams of product.

Examination by optical microscope showed that this product consisted of uniform spheres, 5 to 6 microns in diameter; and examination by electron microscope showed that these spheres consisted of an interconnected array of colloidal silica particles, 50 millimicron in diameter, which were linked together at points of contact to yield somewhat fragile, porous spheres consisting of a three-dimensional network of silica. The specific surface area of the product was determined to be 46 m$^2$/g.

For comparison, a sample of the original sol was air dried to give a granular gel having a specific surface area only slightly less than that of the starting silica. A sample of this powder, from which the organic material had been burned off, was then heated in air at 850° C. for 2 hours, to increase the strength of the porous spherical particles. The specific surface area of the product remained unchanged. A portion of the product was then heated to 1050° C. for 2.5 hours and the specific surface area was determined to be 30 m$^2$/g.

EXAMPLE 2

A sol of silica particles of about 100 millimicrons in diameter made from silicon metal by the process described by J. H. Balthis in U.S. Pat. No. 2,614,994 and U.S. Pat. No. 2,614,995 and V. R. Montenyohl and C. M. Olson in U.S. Pat. No. 2,614,993.

The precipitation of the spherical complex product of colloidal silica and urea formaldehyde was carried out, as in Example 1, using 100 mls. of the above sol containing 15.6 grams of $SiO_2$. The pH was adjusted to 2.0 with concentrated hydrochloric acid, then, 100 mls. of water, 15 grams of urea, and 25 grams of a 37.5% aqueous solution of formaldehyde were added and the pH of the mixture was readjusted to 2 with acid. The mixture was then stirred slowly for 30 minutes while the clear solution became opaque and white with precipitation of the product.

The precipitated spheres of urea formaldehyde-silica complex had a diameter of 5 microns. When the organic matter was burned out at 550° C., the silica had a specific surface area of 17.2 m$^2$/g. After the silica was heated to 900° C., the specific surface area of the microspheres was 17.4 m$^2$/g, and after heating at 1050° C. the specific surface area of the microspheres was 15.7 m$^2$/g. The product was essentially free of sodium.

The porous spheres consist of ultimate spherical particles linked together in a porous three-dimensional array as indicated in a scanning electron micrograph prepared from the fractured surface of a sphere which had been broken in two.

EXAMPLE 3

A sol of pure silica particles about 200 millimicrons in diameter, were prepared according to the process of Werner Stöber and Arthur Fink, disclosed in the Journal of Colloid and Interface Science 26, 62–69 (1968), by hydrolyzing ethyl silicate in an alcoholic medium containing suitable amounts of water and ammonia. This sol was diluted with water to give 400 mls. of sol containing 35.6 grams of silica. The pH was adjusted to 2 with concentrated hydrochloric acid. Then 30 grams of urea was dissolved in the sol and 48 grams of 37% formaldehyde solution was added to the mixture. The mixture was allowed to stand for 16 hours and the spherical product recovered. The diameter of the spheres was 10 to 18 microns. After burning out the organic polymer, about 87% of the silica was recovered in the form of porous silica spheres averaging 15 microns in diameter. The specific surface area of the product after being heated for 2 hours at 900° C. was 15.6 $m^2/g$. After 2 hours at 1050° C. the specific surface area was 14.2 $m^2/g$.; and the spheres, which were still about 15 microns in diameter, were still composed of ultimate particles of the original 200 millimicrons diameter.

EXAMPLE 4

A commercial sol, Ludox TM colloidal silica was used as the source of silica. This material is an aqueous dispersion of 22 millimicron silica particles stabilized with a small amount of alkali, present as sodium hydroxide, containing 50% by weight of $SiO_2$. Twenty-four grams of this sol was diluted with 76 mls. of water, so that a total of 16.7 grams of $SiO_2$ was employed. To this sol, acid was added to lower the pH to 2, and then 15 g. of urea and 25 g. of 37.5% aqueous formaldehyde solution were added. The pH again reduced to 2, and the mixture stirred slowly as the white precipitate of the complex formed. After washing and restirring the product as described in Example 1, the yield of porous spherical silica obtained, after burning off the organic matter at 550° C. in air, was about 95%. The product consisted of spheres ranging from 2 to 14 microns in diameter, but most of the material was in the range from 5 to 10 microns. The porous silica was slurried 18 hours in 10% hydrochloric acid, washed and dried. The specific surface area after being heated at 540° C. was 115 $m^2/g$. After being heated to 900° C., the specific surface area was 110 $m^2/g$., and after being heated to 1050° C., the specific surface area was 0.4 $m^2/g$. This indicates that, due to traces of residual alkali within the particles, sintering of the porous spheres reduces these to a nonporous condition and somewhat smaller average diameter.

EXAMPLE 5

A commercial silica sol, known as Ludox AS colloidal silica, contains particles 15 millimicrons in diameter stabilized with ammonia was used as a source of silica free from sodium ions. This sol was diluted and mixed with urea and formaldehyde in the same proportions to the silica present as described in Example 4. The reaction mixture of 140 grams contained 16.7 grams of silica, 15 grams of urea, and 25 grams of 37% formaldehyde. The porous spherical silica product obtained after burning out the urea formaldehyde resin at 550° C. in air, corresponding to a yield of 96%. It had a specific surface area of 187 $m^2/g$., and consisted of porous spheres 3 to 5 microns in diameter. When heated at 900° C., the specific surface area was 215 $m^2/g$.; after being heated at 1050° C., the specific surface area was still 188 $m^2/g$., and the spheres shrank very little in size.

EXAMPLE 6

Ludox SM colloidal silica, a commercial sol of silica particles, 9 millimicrons in diameter, stabilized with sodium hydroxide was used. The proportions of silica and urea and formaldehyde were the same as in Example 5, and the yield of porous silica spheres was 84%. The spheres were 4 to 12 microns in diameter. The specific surface area of the product after being heated at 900° C. was 360 $m^2/g$. After being heated to 1050° C. the specific surface area was 13.5 $m^2/g$.; the low value indicating the sintering effect of traces of sodium.

EXAMPLE 7

As a source of 5 millimicrons silica, particles Nyacol 215, obtained from Nyanzo, Inc., at Ashland, Mass., was used. When the silica sol was acidified and dried, the silica had a specific surface area of about 500 $m^2/g$. In this case, the reaction mixture, weighing 140 grams, contained 15 grams of silica 15 grams of urea, and 25 grams of 37.5% formaldehyde, the reaction being carried out as described in Example 1. The product spheres were very uniform and 7 to 8 microns in diameter. The product obtained after removing the organic material from the product at 550° C. had a specific surface area of 494 $m^2/g$. The product was slurried in 10% hydrochloric acid, washed and dried. After the powder was heated at 900° C. for 2 hours, the specific surface area was 415 $m^2/g$. After the powder was heated at 1050° C., however, the specific surface area dropped to 158 $m^2/g$., since traces of sodium remained in the product.

By comparison, when polysilicic acid, obtained by adding a solution of sodium silicate to excess acid to obtain a final pH of about 2, was used as a source of silica and reacted with urea and formaldehyde in the same proportions as above, porous silica spheres, 5 to 8 microns in diameter were obtained, after burning out the organic material. This represented a yield of only 6% of the silica. This silica was slurried 18 hours in 10% hydrochloric acid and washed free of chloride and dried. The spheres had a specific surface area of 574 $m^2/g$. After being heated at 900° C., the specific surface area was 704 $m^2/g$., but after being heated to 1050° C. the value was less than 100 $m^2/g$. The very low yield of product and drastic drop in specific surface area and porosity at the elevated temperature, in spite of low sodium content, indicates the marked difference between product obtained from polysilicic acid, in which the silica consisted of molecules or particles much smaller than 5 millimicrons (as used by Kirk in the process disclosed in the prior art) and the products of this invention made from colloidal particles larger than 5 millimicrons in diameter.

EXAMPLE 8

As a source of alumina, a colloidal dispersible form of fibrillar boehmite, A100H, consisting of fibrils about 5 millimicrons in diameter and a quarter to a half a micron in length, having a specific surface area of about 290 $m^2/g$., was employed. This type of alumina is described in Example 3 of U.S. Pat. No. 2,915,475 issued Dec. 1, 1959, to J. Bugosh. This powder contains acetate ions and the $Al_2O_3$ content is about 72% by weight. An amount of this dispersible powder containing 11.5 grams of aluminum oxide was dispersed in water to give 333 mls. of translucent sol. To this was added 15 grams of urea and the mixture was stirred until the latter dissolved. Then 25 grams of 37% formaldehyde solution was added to the mixture, and the pH was adjusted to 2 by adding hydrochloric acid. After a few minutes, the mixture became milky white and opaque, and examination under the microscope showed the presence of discrete, uniform, solid spheres about 1 micron in diameter. The reaction mixture was permitted to stand at room temperature for 16 hours, then agitated in a blender and permitted to settle. The translucent supernatant liquid containing no spheres, but containing some alumina, was discarded and the spheres in the precipitate were washed by repeated dilution with water and allowed to settle. The precipitated product was then diluted with 3 volumes of normal propyl alcohol, again permitted to settle, and after pouring off the supernatant clear liquid, the sedimented cake was dried in a vacuum oven for 16 hours at 60° C. The soft, pulverulent powder weighed 16.5 grams and contained 29% ash, which was $Al_2O_3$. Analysis of the powder showed the presence of 21.2% carbon, 4.2% hydrogen, and 23.1% nitrogen. The recovery of alumina in the product was about 42%.

A quantity of the dried microspheres, which were between 1 and 2 microns in diameter and remarkably uniform in size, was heated in an air oven at 540° C. for 18 hours to burn out the organic matter, leaving spheres of gamma alumina. Examination by electron microscope showed each sphere to consist of an interwoven mass of short fibrils of alumina. The specific surface area of these porous spheres was 320 $m^2/g$. At this stage, the spheres are relatively fragile, since the fibrils have not become sintered together. However, after heating a portion of the material at 1050° C., the surface area dropped to 113 $m^2/g$., and the spheres shrank to about 1 micron in average diameter. The particles had sufficient mechanical strength to resist being crushed under a coverglass when the latter was rubbed against the underlying microscope slide.

Figure 1:
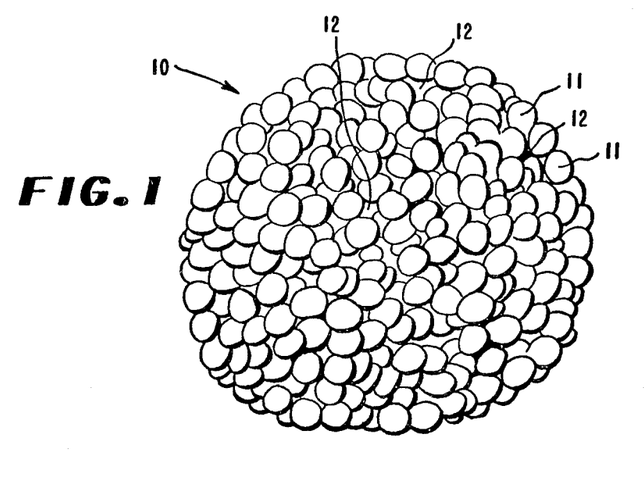
FIG. 1 shows a single porous powder particle of the present invention with the number 10 indicating the microparticle generally, the number 11 indicating the colloidal ultimate particles and the number 12 indicating the pores in the microparticle which can be filled with a polymer.
Figures 2, 3:
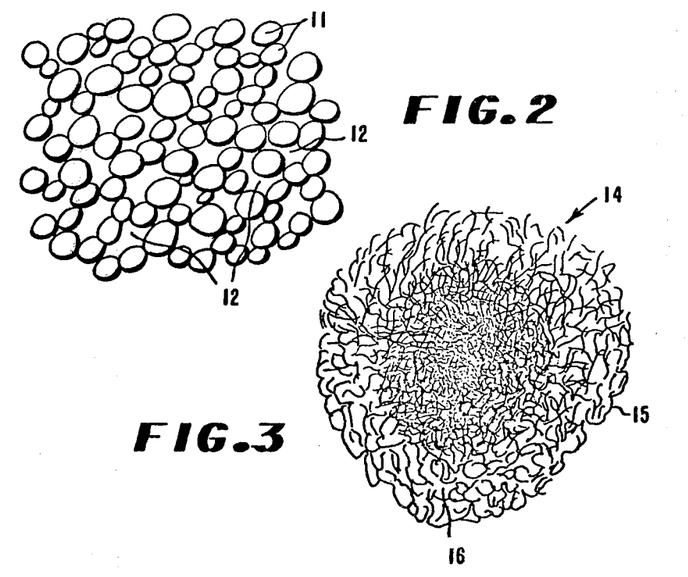
FIG. 2 is a diagrammatic view of a section of a porous powder particle of the present invention showing the lightly coalesced colloidal particles 11 separated by small uniform sized ports 12 from which polymer has been removed.
FIG. 3 shows a single porous microparticle 14 made from colloidal alumina fibrils 15 and containing a plurality of pores 16.

A portion of the sintered gamma alumina spheres was then heated at 1350° C. for 2 hours to convert the spheres to particles of apha alumina. In this case, each sphere appeared to shrink to roughly spherical grains of alpha alumina, each consisting of from one to several individual crystals. The alpha alumina grains were from ¼ to ½ micron in diameter, with a specific surface area of 4 square meters per gram. This product is useful as a polishing agent for hard materials. This particle is shown in FIG. 3.

EXAMPLE 9

An aqueous acid stabilized sol of colloidal zirconia, containing 25% zirconium oxide in the form of particles 50 to 100 millimicrons in diameter, made up of aggregates of 5 millimicron particles and having a specific surface area of 190 $m^2/g$., was diluted to obtain 166 mls. of sol containing 13.6 grams of zirconium oxide. The pH adjusted to 2 with 0.5 mls. of concentrated hydrochloric acid, then 7.5 grams of urea was added and the mixture stirred until the latter was dissolved. Finally, 12.5 grams of 37% formaldehyde was added and the pH again adjusted to 2 with a little more acid. This mixture was allowed to stand at room temperature. Within a few minutes the mixture became white and opaque due to the formation of a precipitate of spheres ranging from 2 to 8 microns in diameter, most of the material being between 5 and 8 microns. The mixture was allowed to stand for 18 hours, and then agitated in a high speed mixer, diluted 10-fold with water and washed by sedimentation and decantation. The washing was repeated three times, and the white settled precipitate recovred and dried in a vacuum oven at 60° C. About 33% of the zirconium oxide was recovered in the spherical product.

After burning out the organic matter at 540° C. in air, the porous zirconia spheres had a specific surface area of 500 $m^2/g$. After being heated at 900° C. for 2 hours, the specific surface area was 582 $m^2/g$., and after being heated for 2 hours at 1050° C. the specific surface area was 381 $m^2/g$. The porous zirconia spheres are useful as a catalyst base.

EXAMPLE 10

A sol of colloidally subdivided particles of titanium dioxide 10 to 80 millimicrons in diameter was obtained by dispersing 10.2 grams of the colloidal titania in 200 mls. of water with dilute acid. Then 7.5 grams of urea 12.5 grams of 37% formaldehyde and sufficient hydrochloric acid to lower the pH to 2 were added to this mixture. The washed and dried spheres, which were 7 to 8 microns in diameter, containing 22.4% by weight of titanium dioxide. The yield of titania in spherical form was about 22%. These spheres were oxidized at 540° C. in air to recover porous titania spheres. When the spheres were heated to 1350° C., drastic sintering of the spheres occurred, so that the specific surface area was less than one square meter per gram. These solid, nonporous spherical particles were strongly bonded together to give a hard, coherent, porous mass.

EXAMPLE 11

Alpha alumina in the form of 0.4 micron particles of irregular shape was used as the source of alumina for producing spheres, 3 to 5 microns in diameter, of urea formaldehyde polymer and alpha alumina. Sixteen and a half grams of the alpha alumina powder was dispersed in 330 mls. of dilute hydrochloric acid at pH 2, and 15 grams of urea were added and dissolved. Then 25 grams of 37% formaldehyde was added, and the pH readjusted to 2. The mixture was allowed to stand for 24 hours. After 1.5 hours, most of the alumina and urea formaldehyde had precipitated as relatively uniform spheres containing 49% by weight of alumina, and using 89% of the starting alumina. These spheres were oxidized at 540° C. in air for 24 hours, giving fragile, porous spheres of alpha alumina having a specific surface area of 11 square meters per gram. When these were heated for 2 hours at 1350° C., the spheres shrank to a nonporous state and were sintered together into a porous alumina mass having a specific surface area of one square meter per gram.

EXAMPLE 12

An alumina obtained by oxidation of aluminum chloride in the vapor phase, available as Alon C, from the Cabot Corp. of Boston, Mass., was dispersed in water to give a 5% turbid suspension, in which most, but not all, of the particles were dispersed as particles or aggregates less than half a micron in size. Enough hydrochloric acid was added to raise the pH to 2 and aid the dispersion. Then 15 g. of urea and 25 g. of 37% formaldehyde were added and the pH was readjusted to 2. Particles from 0.5 to 1 micron in diameter were obtained by precipitation in 2.5 hours. These appeared to be spherical under the optical microscope and contained 44% by weight of alumina. The product was washed and dried; and the organic polymer removed by air oxidation, after which the spherical alumina particles were further sintered at elevated temperature.

The spheres obtained after removal of organic polymer by oxidation at 540° C. had a specific surface area of 200 m²/g. After being heated 2 hours at 1350° C., the spheres were evidently still porous, with a specific surface area of 12.9 m²/g., which is remarkably high for alumina that had been exposed to such a temperature. When this powder was mechanically ground or pulverized in water slightly acidified to pH 3, uniform discrete particles of alpha alumina, about 0.5 microns in diameter and free from coarser crystals, was obtained. This powder is useful as a polish for optical glass and jewels. Apparently each original spherical particle of colloidal alumina was converted to a porous sphere of alpha alumina. This is a useful way to produce discrete alpha alumina particles of a uniform desired size.

EXAMPLE 13

A spherical form of antimony pentoxide and urea formaldehyde copolymer was obtained by first preparing a dispersion of colloidal antimony pentoxide by hydrolyzing antimony glycollate in water. A solution containing 8.8 g. of the colloidal oxide and 238 mls. of dilute hydrochloric acid was prepared with a pH of about 2. Then 10.7 g. of urea was dissolved in the mixture, and 17.8 g. of 37.5% formaldehyde was added. The pH was readjusted to 2 with hydrochloric acid and the mixture permitted to stand for 48 hours. The white precipitate was broken up by strong agitation in a blender, and washed by resuspension and decantation until free from soluble salts. The air dried powder weighed 22.1 gms. This soft, readily dispersible powder may be used to incorporate antimony pentoxide into organic polymers to improve flame resistance.

EXAMPLE 14

A form of ferric oxide produced in the vapor phase by oxidation of ferric chloride consisting of particles of colloidal size was dispersed in 340 mls. of water at pH 2. This sol contained 5.2 g. of $Fe_2O_3$. To this sol, 15 g. of urea was added and dissolved. Then 25 g. of 37% formaldehyde was added and the pH was readjusted to 2. The mixture was then permitted to stand for 48 hours. Particles of rounded, although not perfectly spherical, shape having a diameter of 5 to 7 microns were obtained as a precipitate. After washing and drying, the dark brown powder weighed 32 grams, and contained 51% by weight of iron oxide. It was a soft powder which easily mixed with colloidal silica to give an ink which retained its color at high temperatures, useful for marking ceramic materials.

EXAMPLE 15

Spheres of silica and melamine-formaldehyde polymer were made by dissolving 12.6 grams of melamine in 25 grams of 37% formaldehyde solution, stirring the mixture at 70° to 80° C. until a clear solution has formed in about 10 minutes, then cooling and diluting with 40 mls. of water and adding 20 mls. of a sol of 50 millimicron silica particles containing 13.8 grams of silica. The total volume of the reaction mixture was 150 mls. and the pH was 8.6. This was divided into 3 portions and adjusted to pH's 2, 3, 4, 5 and 6. Initial experiments showed that polymer also formed at pH 4 and 5, but not at 3 or 6. The products obtained at pH 4 and 5 consisted of very small spheres, about ½ to 1 micron in diameter.

After 24 hours standing, some product was separated from the mixture at pH 6. The very finely-divided products were separated by centrifuging and the analyses for ash ranged from 35 to 81%.

What is claimed is:

1. A process for forming uniform-sized inorganic microspheres comprising the steps of:
    a. forming an aqueous sol containing uniform-sized inorganic- refractory colloidal particles which have hydroxylated surfaces and which are dispersible in said aqueous sol, said colloidal particles being isodimensional or rod-shaped particles with at least two dimensions in the range of 5 to 500 millimicrons and a third dimension in the range of 5 to 1,000 millimicrons;
    b. forming a homogeneous solution of said aqueous sol with a polymerizable material comprising formaldehyde and a second organic material selected from the group consisting of urea and melamine;
    c. reducing the pH of said solution to a level at which polymerization of said polymerizable materials occurs to cause coacervation of said organic material and said colloidal particles into substantially spherical microspheres having a diameter of about 0.5 to about 20.0 microns and to initiate copolymerization of said organic materials, said colloidal particles being insoluble in the acid medium at the selected pH;
    d. solidifying the microspheres so formed;
    e. collecting, washing and drying said microspheres; and
    f. oxidizing said microspheres at elevated temperatures to burn off the organic material without melting said colloidal particles, whereby forming uniform-sized porous inorganic microspheres.

2. The process of claim 1 wherein said colloidal particles are colloidal silica particles.

3. The process of claim 1 wherein said colloidal particles are metallic oxide particles.

4. The process of claim 1 wherein said colloidal particles are composed of material selected from the group consisting of silica, alumina, titania, zirconia, ferric oxide, tin oxide, antimony oxide or combinations thereof.

5. The process of claim 1 further comprising the step of sintering said porous microspheres by subjecting them to an elevated temperature sufficient to reduce the surface area of the sphere to a value at least about 10% less than the surface area of the colloidal particles from which it was produced.

6. The process of claim 1 further comprising the step of subjecting said mixture to a mixing action of sufficient intensity to prevent aggregation of the microspheres during their formation.

* * * * *